US010037257B1

(12) United States Patent
Habusha et al.

(10) Patent No.: US 10,037,257 B1
(45) Date of Patent: Jul. 31, 2018

(54) EXAMINING LOCAL HARDWARE USING A LOCATION-AWARE PERIPHERAL DEVICE

(71) Applicant: Amazon Technologies, Inc., Seattle, WA (US)

(72) Inventors: Adi Habusha, Moshav Alonei Abba (IL); Eric Jason Brandwine, Haymarket, VA (US); Stephen Edward Schmidt, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 15/084,251

(22) Filed: Mar. 29, 2016

(51) Int. Cl.
*G06F 11/30* (2006.01)
*G06F 13/42* (2006.01)
*G06F 3/06* (2006.01)
G06F 21/57 (2013.01)
G06F 21/55 (2013.01)

(52) U.S. Cl.
CPC .......... *G06F 11/3027* (2013.01); *G06F 3/061* (2013.01); *G06F 3/0655* (2013.01); *G06F 3/0679* (2013.01); *G06F 13/4282* (2013.01); G06F 21/55 (2013.01); G06F 21/57 (2013.01)

(58) Field of Classification Search
CPC .................................. G06F 21/57; G06F 21/55
See application file for complete search history.

(56) References Cited

U.S. PATENT DOCUMENTS

| 8,490,206 B1 | 7/2013 | Fish |
| 2004/0030912 A1* | 2/2004 | Merkle, Jr. ............. G06F 21/10 726/26 |
| 2012/0239950 A1 | 9/2012 | Davis et al. |
| 2013/0139262 A1 | 5/2013 | Glew et al. |
| 2016/0378509 A1* | 12/2016 | Venkatasubba ....... G06F 9/4411 713/2 |

OTHER PUBLICATIONS

U.S. Appl. No. 15/084,367, filed Mar. 29, 2016, Titled: Location-Aware Security Configuration of Peripheral Devices.

* cited by examiner

*Primary Examiner* — Zachary K Huson
(74) *Attorney, Agent, or Firm* — Kilpatrick Townsend & Stockton LLP

(57) ABSTRACT

Provided are methods and peripheral devices for examining local hardware and configuring a location-aware peripheral device accordingly. In some implementations, a peripheral device may be configured to examine, using a bus interface, another device connected to the bus. Examining may include determining characteristics of the other device. In some implementations, the peripheral device may further compare the determined characteristics against information derived from data stored in a memory of the peripheral device. The information may describe acceptable operating parameters for the computing system. In some implementations, the peripheral device may further determine, based on a result of the comparison, a status for the computing system. The status may indicate whether the computing system is operating within acceptable operating parameters. The status may direct an action by the peripheral device.

23 Claims, 7 Drawing Sheets

EXAMINING LOCAL HARDWARE USING A LOCATION-AWARE PERIPHERAL DEVICE

BACKGROUND

Computing systems may include peripheral devices. Peripheral devices may add to or change the functionality of the computing system. In many cases, peripheral devices are connected to the computing system using an interconnect. The interconnect may implement a standard bus protocol, such as any of the Peripheral Component Interconnect (PCI) family of bus protocols.

The bus protocols used to connect peripheral devices to a computing system generally give the peripheral device a broad range of access. For example, a peripheral device may, using the interconnect, be able to access another peripheral device, the computing system's memory, and/or the computing system's processor.

The arrangement of the peripheral devices connected to a computing system may change. For example, a peripheral device can be added or removed. The configuration of a peripheral device may also change. In some cases, changing the arrangement of the peripheral devices, or their configuration, may have undesirable effects on the computing system.

BRIEF DESCRIPTION OF THE DRAWINGS

Various embodiments in accordance with the present disclosure will be described with reference to the drawings, in which.

DETAILED DESCRIPTION

Figure 1:
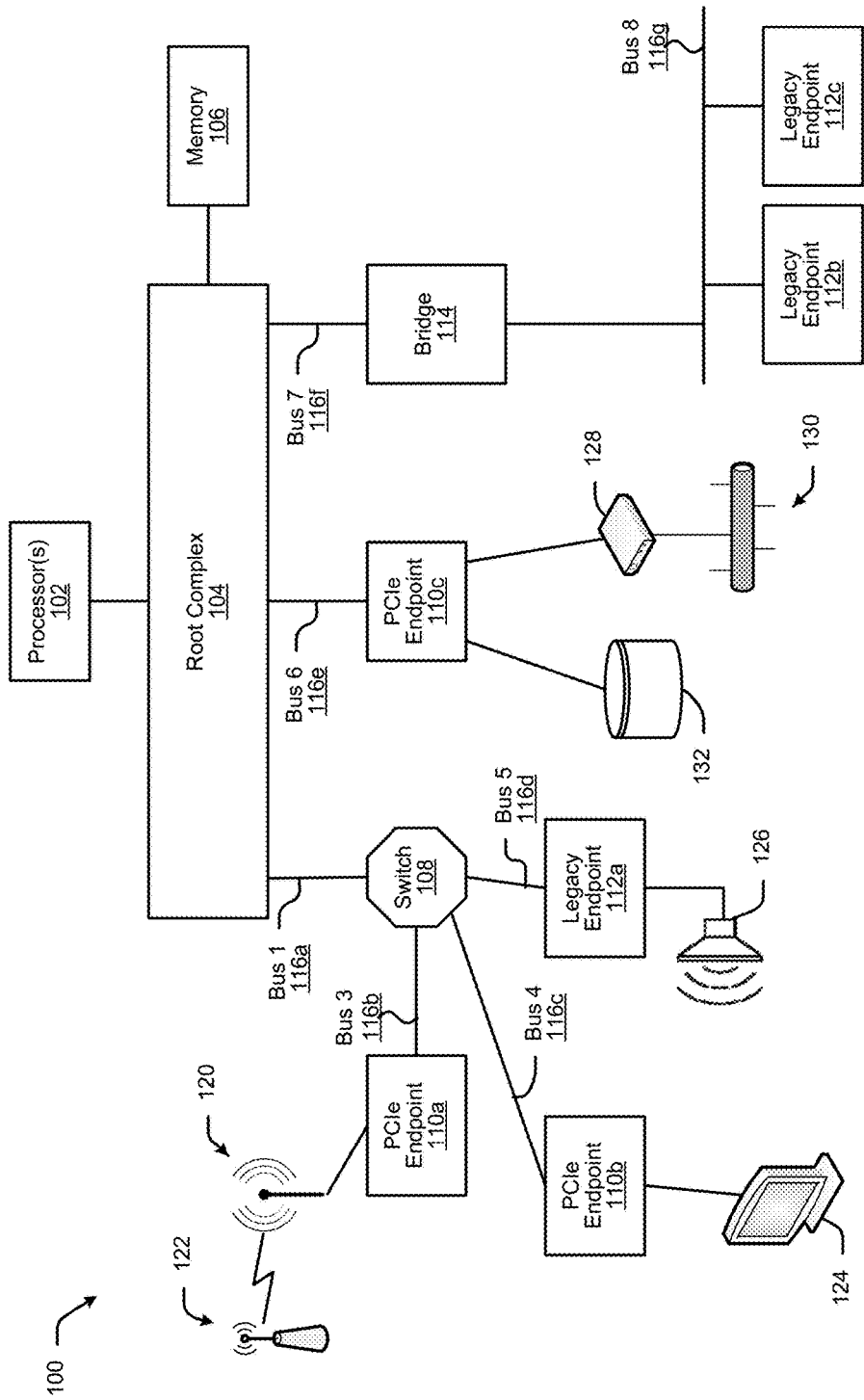
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computing systems may include peripheral devices. Peripheral devices may add to or change the functionality of the computing system. Examples of peripheral devices include storage devices, displays, speakers, and wired and/or wireless network adapters, among others. In many cases, peripheral devices are connected to the computing system using an interconnect. The interconnect may implement a standard bus protocol, such as any of the PCI family of bus protocols. Transactions transferred over the interconnect typically include at least an address, designating a destination for the transaction. Write transactions may also include data to write to the address.

Standard bus protocols for connecting peripheral devices to a computing system have traditionally been designed for speed, and not for security. Peripheral devices have historically been slow, and Input/Output (I/O) to peripheral devices remain much slower than computer system processor speeds. Peripheral devices can also provide a way to bypass a computing system's security features. For example, some computers can be booted from a Universal Serial Bus (USB) flash drive, thus bypassing any of the computer's log-in requirements. Once booted, files on the computer's hard drive may be freely accessible.

Adding security to standard bus protocols may be difficult. Changing the standard for a bus protocol is a lengthy and arduous process. Additionally, any changes must be backwards-compatible, so that older devices can continue to communicate with newer devices that support the updated protocol. Moreover, any changes to the protocol should not have a negative impact on the speed of the bus.

A location-aware peripheral device that is able to examine and monitor other devices in the same computing system may be a more practical solution. In various implementations, a location-aware peripheral device may be configured to examine the characteristics of other devices connected to a computing system to which it is attached. These characteristics may include information about the configuration of the other devices, and/or any activity conducted by those other devices. In various implementations, the location-aware peripheral device may compare the characteristics against information derived from data stored in its memory, where this information describes acceptable operating parameters for the computing system. Based on this comparison, the location-aware peripheral device may determine a status for the computing system, where the status indicates whether the computing system is operating within acceptable parameters.

When the computing system is not operating within acceptable parameters, in various implementations, the location-aware peripheral device may perform an action. For example, the location-aware peripheral device may issue alerts or disable itself. In some cases, by disabling itself the location-aware peripheral device may also disable the computing system. The location-aware peripheral device may thus be able to prevent another device in a computing system from affecting the computing system in an undesirable way.

FIG. 1 illustrates an example of a computing system 100 that includes multiple peripheral devices. Peripheral devices may include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or with a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-c and legacy endpoints 112a-c. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The root complex 104 is an example of a processor interface device, that is, a device that provides an interface between a processor sub-system and other devices, such as peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors and memory.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read Only Memory (ROM), such as Programmable Read Only Memory (PROM), Erasable Programmable Read Only Memory (EPROM), Electrically Erasable Programmable Read Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example, Small Computer System Interface (SCSI), Serial ATA (SATA), or Parallel ATA (PATA), among others.

The switch 108 functions as a multi-port connecter between various devices, including the root complex 104, peripheral devices, and possibly other switches and bridges. The switch 108 may route transactions between any of the devices connected to it. For example, the switch 108 may route transactions between the PCIe endpoints 110a-b and the legacy endpoint 112a, and between the various endpoints 110a-b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example the legacy endpoints 112b-c are connected to a shared PCI bus 116g. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 1101-c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116e. Similarly, the bridge 114 is connected to the root complex with Bus 7 116f. Each of the PCIe endpoints 110a-b and the legacy endpoint 112a are also connected to the switch 108a with individual busses 116b-d. The connections between each of the root complex 104, the switch 108, the bridge 114, the PCIe endpoints 110a-c and the legacy endpoint 112a are point-to-point because each of the busses 116a-g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 116a (Bus 0 may be internal to the root complex 104). Similarly, each of the busses connecting the PCIe endpoints 110a-b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116e, while the connection between the root complex and the bridge 114 may be labeled Bus 7 116f. Finally, the shared bus downstream from the bridge 114 may be labeled Bus 8 116g. In most cases the numbering of the busses is arbitrary, though bus numbers are generally be assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116a, 116e, 116f, connected to the root complex 104, and identify the switch 108, the PCIe endpoint 110c, and the bridge 114. Upon discovering the switch 108, the processors 102 may next scan the busses 116b-d connected to the switch 108. The processors 102 thereby discover the PCIe endpoints 110a-c and the legacy endpoint 112a. Upon discovering the bridge 114, the processors 102 may also scan Bus 8 116g; however, the bridge 114 may translate the scanning instructions to the protocol implemented by Bus 8 116g.

While scanning the busses, or possibly after, the processors 102 may also transmit configuration transactions to each of the devices it discovers. Configuration may include, for example, assigning one or more address spaces. For example, PCI devices typically include one or more of a memory address space and/or an I/O address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

I. Examining Local Hardware

Figure 2:
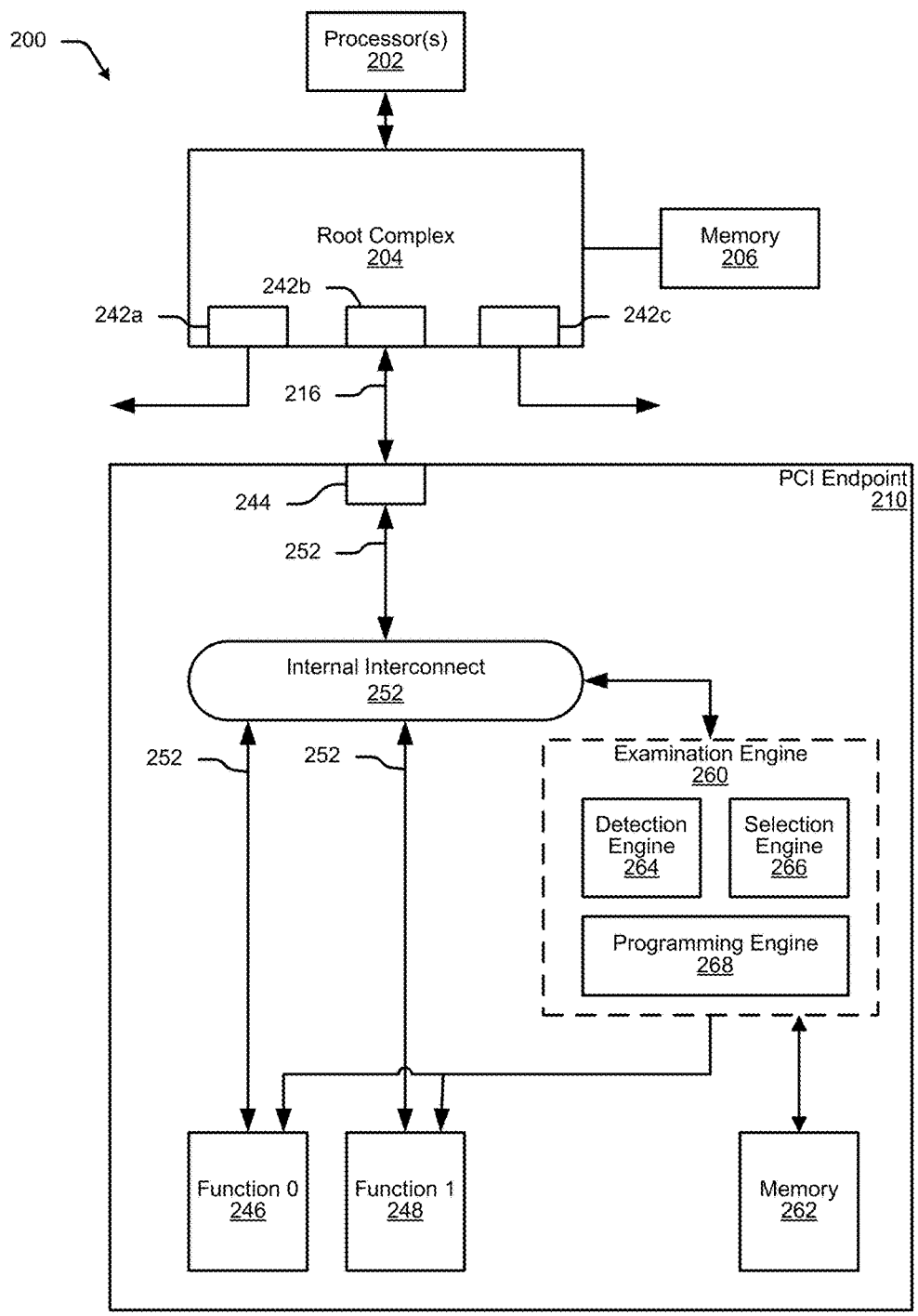
FIG. 2 illustrates an example of a computing system including at least one PCI endpoint.

FIG. 2 illustrates an example of a computing system 200 including at least one PCI endpoint 210. The PCI endpoint 210 is also an example of a peripheral device that can be implemented as a location-aware, self-configuring peripheral device. In this example, the PCI endpoint 210 is in communication with a root complex 204 or a similar processor interface device over a PCI interconnect 216. The root complex 204 may be in communication with one or more processors 202 and a memory subsystem 206. The root complex 204 may include one or more ports 242a-c. These ports 242a-c may be connected, using additional PCI interconnects, to PCI switches, bridges, and endpoints, including the illustrated PCI endpoint 210. The root complex 204 may route transactions between the processors 202 and any of the endpoints, switches, or bridges, or between the endpoints, switches, and bridges themselves. In this example, PCI is used as an example of a bus protocol that may be implemented by the computing system 200 to connect to peripheral devices. In various implementations, the computing system 200 can alternatively or additionally connect to peripheral devices using other bus protocols, such as SCSI, SATA, or PATA, among others, or a combination of different bus protocols including PCI.

The processors 202 may be general purpose computing devices that are generally capable of executing software code. A processor may include multiple processing cores. The memory subsystem 206 provides temporary or long-term storage for data that may be used by the computing system 200.

The PCI endpoint 210 in this example includes a port 244, two functions 246, 248, and an internal interconnect 252 that connects the functions 246, 248 to the port 244. The PCI endpoint 210 may also include an optional examination engine 260.

The port 244 may include a physical interface for connecting to a cable, socket, port, or other connection to the PCI interconnect 216. The port 244 may further include hardware and/or software to manage incoming and outgoing transactions. The port 244 may translate an internal transaction from the functions 246, 248 into a PCI transaction for transmission over the PCI interconnect 216. The port 244 may further translate transactions received over the PCI interconnect 216 for transfer over the internal interconnect 252 to the functions 246, 248.

The PCI endpoint 210 in this example includes two functions 246, 248. The functions 246, 248 may include hardware and/or software that provide a service for the peripheral device. A service in this context describes the operations and capabilities of the PCI endpoint 210, and the functionality that the PCI endpoint 210 provides to the computing system 200. For example, in cases where the PCI endpoint 210 is a mass storage controller, Function 0 246 may include the hardware and/or software to provide a hard drive, such as for example a Solid State Drive (SSD). As another example, in cases where the PCI endpoint 210 is also a network interface, Function 1 248 may include the hardware and/or software to provide a network interface, including ports for connecting Category-5 (CAT-5) cables, and/or antennas for connecting wirelessly to network. Two functions are provided as an example. In various implementations, a PCI endpoint may include only one function, or more than two functions. A PCI endpoint that includes more than one function may be referred to as a multi-function device.

The functions 246, 248 may communicate with the port 244 over an internal interconnect 252. The internal interconnect 252 may be implemented using a standard bus protocol, such as Coherent Hub Interface (CHI), Advanced eXtensible Interface (AXI), Advanced High-Performance Bus (AHB), or the like. The internal interconnect 252 may also be implemented using a proprietary bus protocol. The protocols implemented by the internal interconnect 252 typically defines a transaction format for transactions sent across the internal interconnect 252. A transaction format typically includes at least an address, indicating the target of the transaction, and a transaction type, such as read or write. Write transactions may further include data. A transaction may include other information that either further identifies the target of the transaction, and/or provides further details about a data read or data write.

In some implementations, the PCI endpoint 210 may include an examination engine 260. In some implementations, the examination engine 260 may provide location-awareness and self-configuration functionality to the peripheral device. For example, in some implementations, the examination engine 260 may include a detection engine 264, a selection engine 266, and a programming engine 268. The detection engine 264 may be configured to detect the characteristics of other devices connected to the computing system 200, as explained in further detail below.

In some implementations, the selection engine 266 may use the determined characteristics to select a status for the computing system. The status may indicate whether the computing system is operating within acceptable parameters. To determine the status, the selection engine may compare the characteristics against information derived from data stored in the memory 262. This data may describe acceptable operating parameters for the computing system.

The programming engine 268 may configure the PCI endpoint 210 according to the selected status. For example, the programming engine 268 may disable one or both of the functions 246, 248. The functions 246, 248 may each, for example, include a configuration register that, when written to, disables the functions 246, 248. When the functions 246, 248 are enabled, the programming engine 268 may configure the functions 246, 248. For example, the programming engine 268 may program which capabilities each function 246, 248 is to provide.

Each of the detection engine 264, selection engine 266, and programming engine 268 can be implemented as individual integrated circuits, or as a combined integrated circuit. Alternatively or additionally, one or more of the engines 264, 266, 268 may be implemented in firmware, and the examination engine 260 may include an integrated circuit for executing the firmware. Alternatively or additionally, one or more of the engines 264, 266, 268 may be implemented in a combination of hardware and firmware.

Figure 3A:
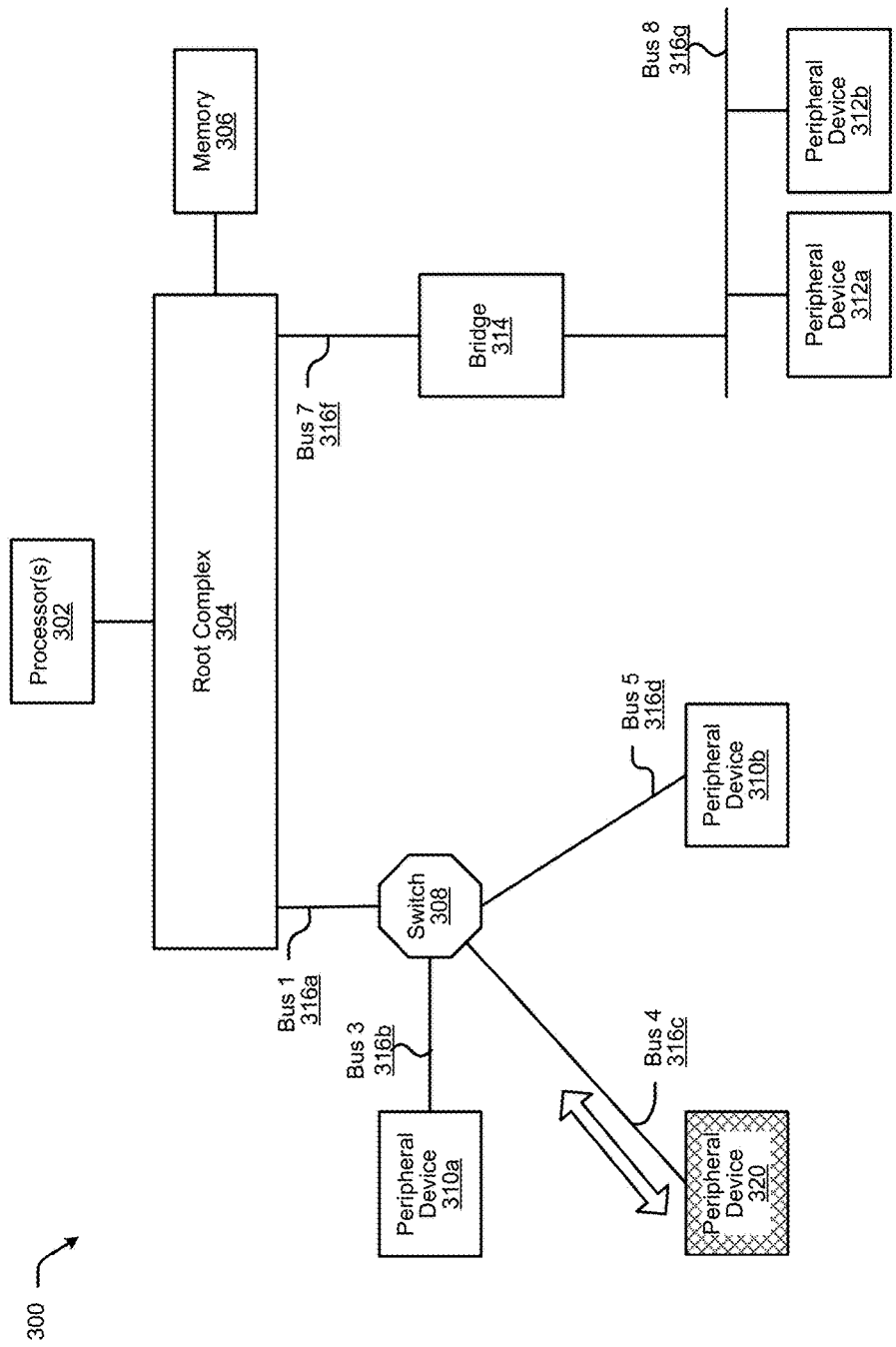
FIG. 3A illustrates one example of an internal configuration of a computing system, where the computing system includes a location-aware peripheral device.

FIG. 3A illustrates one example of an internal configuration of a computing system 300, where the computing system includes a location-aware peripheral device 320, similar to the PCI endpoint 210 described above. In FIG. 3A, the example computing system 300 includes one or more processors 302, a root complex 304, a memory subsystem 306, a switch 308, a bridge 314, and a number of peripheral devices 310a-b, 312a-b, including the location-aware peripheral device 320. The processors 302 may be general purpose computing devices, and are generally capable of executing software code. A processor may include multiple processing cores. The root complex 304 may be a hardware and/or software device that connects the processors 302 and the memory subsystem 306 to the peripheral devices 310a-b, 312a-b, 320. The root complex 304, or a similar processor interface device, may direct transactions between its various ports, and/or between the ports and the processors 302. The memory subsystem 306 may provide temporary or long-term storage for data that may be used by the computing system 300. The memory subsystem 306 may include volatile and/or non-volatile memory. The peripheral devices 310a-b, 312a-b, 320 may provide the computing system 300 with various functionality, such as displaying information, taking user input, printing, data storage, and network connectivity, among others. The peripheral devices 310a-b, 312a-b, 320 may communicate with the processors 302, memory subsystem 306, and each other using a bus protocol, such as PCI, SCSI, SATA, PATA, or the like, or using a combination of bus protocols.

In this example, the components of the computing system 300 are connected to each other using a number of busses 316a-h. For example, in this example, the root complex 304 is connected to the switch 308 using Bus 1 316a and the bridge 314 using Bus 316f. The switch 308 is further connected to the peripheral device 310a using Bus 3 316b, the location-aware peripheral device 320 using Bus 4 316c, and the peripheral device 310b using Bus 5 316d. The bridge 314 may further be connected to the peripheral devices 312a-b using a shared bus, Bus 8 316g. The peripheral devices 312b-c connected to Bus 8 316g may be implemented using a different bus protocol than the other peripheral devices 310a-b in the system 300. Each of these busses 316a-g may be assigned an identifier, which may be used by the various components to identify their location in the computing system 200. In this example, the busses 316a-g have been assigned numeric identifiers.

The location-aware peripheral device 320 may be configured to examine the components of the computing system 300, and determine whether the computing system 300 is operating within acceptable parameters. The location-aware peripheral device 320 may be configured to examine the computing system's 300 devices upon power on, and/or whenever a device in the computing system 300 is changed, and/or periodically while the computing system 300 is operating. The location-aware peripheral device 320 may be configured to examine a specific device in the computing system 300 (e.g., the root complex 304), several devices in computing system 300 (e.g. the peripheral devices 312a-b on the shared bus Bus 8 316g), or all of the devices in the computing system 300.

In examining the devices in the computing system 300, the location-aware peripheral device 320 may determine characteristics of a device. These characteristics may include, for example, the configuration of the device, such as its assigned address space and/or its enabled capabilities. The characteristics may also include information about any software running on the device, such as the type of firmware it is running and/or the firmware version. The characteristics may further include information about the device, such as its type or class, or its manufacturer, or any other information the device is capable of providing. For example, location-aware peripheral device 320 may examine the root complex 304 and the switch 308 to determine, for example, how many ports each has, and which or what type of device is connected to each of those ports. The location-aware peripheral device 320 may, for example, also attempt to determine other information, such as the type and/or number of processors 302, the size and/or type of memories in the memory subsystem 306, and/or the Basic Input/Output System (BIOS) of the computing system 300, among other things.

The location-aware peripheral device 320 may determine the characteristics of the other devices in the computing system 300 by exchanging transactions with each device. For example, the location-aware peripheral device 320 can obtain from the root complex 304 basic information for accessing the other peripheral devices 310a-b, 312a-b, such as each device's address space or spaces. The location aware peripheral device 320 may then send transactions to each of the peripheral devices 310a-b, 312a-b, and possibly also the switch 308 and the bridge 314, to obtain information from each device. Upon encountering a device such as the bridge 314, the location-aware peripheral device 320 may also determine the characteristics of devices connected to the bus (here, Bus 8 316g) on the other side of the bridge by sending transactions to those devices. Using these transactions, the location-aware peripheral device 320 can query information from the other device.

The location-aware peripheral device 320 may alternatively or additionally determine the characteristics of other devices in the computing system 300 by monitoring transactions on the busses 316a-g. The other peripheral devices 310a-b, 312a-b may send and receive transactions to and from each other, and/or to and from the root complex. For example, one of the peripheral devices 310a may make a series of writes and reads to and from memory in the memory subsystem 306. By monitoring these transactions, the location aware peripheral device 320 may be able to determine a pattern of behavior for each of the peripheral devices 310a-b, 312a-b. From this pattern of behavior, the location aware peripheral device 320 may be able to determine characteristics of each peripheral device 310a-b, 312a-b.

The location-aware peripheral device 320 may use the characteristics to determine a status for the computing system 300. The location-aware peripheral device 320 may determine the computing system's 300 status by comparing the characteristics against information derived from data stored on the location-aware peripheral device 320. For example, in some implementations, the location-aware peripheral device 320 may be pre-configured with a description of parameters that are considered acceptable. In some implementations, this description may be general. For example, the description may specify that acceptable parameters are that the computing system is an Intel®-based system running Linux, with one peripheral device 310a that is a network interface, another peripheral device 310b that is a hard drive, and where the network interface and the hard drive never communicate with each other. Alternatively or additionally, in some implementations, the description may be very specific. For example, the owner of the computing system 300 may have provided a description of the components of his computing system, as well as the configuration for each component that is acceptable. This description may be pre-loaded onto the location-aware peripheral device 320. In some implementations, the location-aware peripheral device 320 may be configured with multiple descriptions of acceptable parameters. Additionally, in some implementations, the descriptions may provide whether an exact match is required, or whether a near match is sufficient. Additionally or alternatively, in some implementations, the descriptions may provide a range of acceptable values.

In some implementations, the location-aware peripheral device 320 may obtain a description of what constitutes acceptable parameters the first time the location-aware peripheral device 320 is put into service in a customer's computing system. For example, the location-aware peripheral device 320 may, upon first booting in a customer's computing system, determine the characteristics of the components of the computing system 300, and take these characteristics as the acceptable parameters for the computing system. The location-aware peripheral device 320 may further store the characteristics, and use them in the future as the parameters to compare against the current characteristics of the computing system 300. Alternatively or additionally, the location-aware peripheral device 320 may establish the acceptable parameters for the computing system 300 each time it is powered on. Alternatively or additionally, the location-aware peripheral device 320 may be configured to establish the acceptable parameters upon receiving an instruction, whereupon the location-aware peripheral device 320 will determine and store the current characteristics of the computing system 300.

Figure 3B:
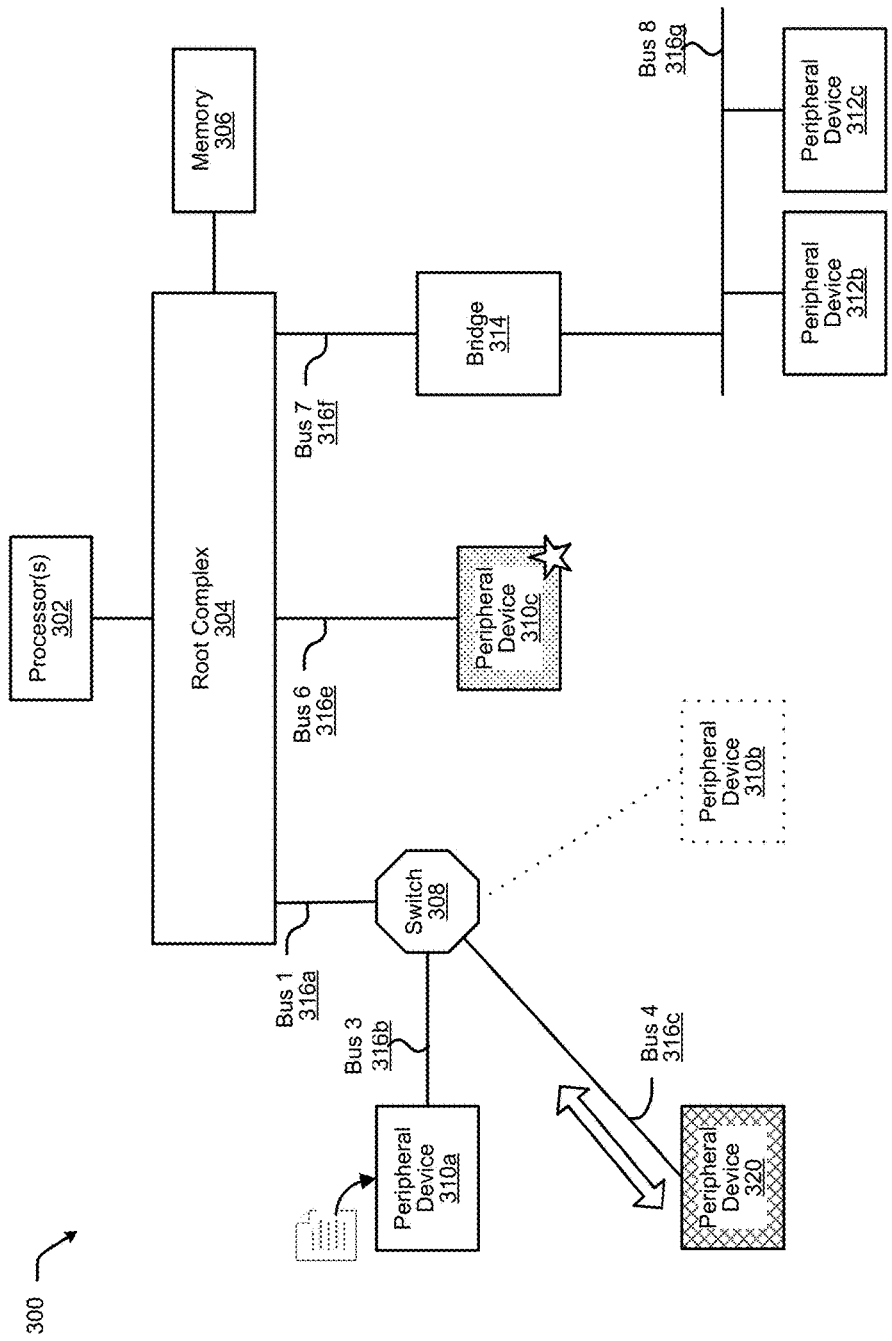
FIG. 3B illustrates the example computing system of FIG. 3A after some example changes have been made.

FIG. 3B illustrates the example computing system 300 of FIG. 3A after some example changes have been made. In FIG. 3B, the configuration of one peripheral device 310*a* has been changed, a different peripheral device 310*b* has been removed, and a new peripheral device 310*c* has been added. These changes could have been made either while the computing system 300 was powered off, or while the computing system 300 was powered. Adding or removing peripheral devices while a computing system is powered on may be referred to as "hot-swapping" or "hot-plugging."

The location-aware peripheral device 320 is also still present in the now modified computing system 300. The location-aware peripheral device 320 may determine the characteristics of the devices in the computing system 300, and determine the computing system's 300, status upon the occurrence of certain events. For example, the location-aware peripheral device 320 may check the computing system's 300 status every time the computing system 300 powers on. Alternatively or additionally, the location-aware peripheral device 320 may check the computing system's 300 status when the new peripheral device 310*c* is "hot plugged," or connected while the computing system 300 is powered on. In some cases, when a new device is added to a computing system while the computing system is running, the presence of the new device may be announced to other devices in the computing system. For example, the location-aware peripheral device 320 may be informed of the new peripheral device's 310*c* address space. Similarly, when the peripheral device 310*b* is removed, this removal may be announced to other devices in the computing system 300. In other cases, addition of the new peripheral device 310*c* and/or removal of the peripheral device 310*b* does not cause an announcement to be made. Thus, in some implementations, the location-aware peripheral device 320 may periodically determine the characteristics of the computing system 300 while the computing system 300 is running, and re-check whether the computing system 300 is still operating within acceptable parameters.

The configuration change to the peripheral device 310*a* may also not be broadcast to other devices in the computing system. This configuration change may have occurred the last time the computing system 300 was powered on, or after the computing system 300 powered on, booted, and did any necessary initialization. Hence, in some cases, the location-aware peripheral device 320 may have no direct knowledge that the configuration of the peripheral device 310*a* has changed. In some implementations, the location-aware peripheral device 320 may thus periodically re-verify that the computing system 300 is still operating within acceptable parameters.

The changes to the computing system 300 may, in some cases, be found to be acceptable. For example, the location-aware peripheral device 320 may determine that the removal of the peripheral device 310*b* is within acceptable operating parameters for the computing system 300. For example, the peripheral device 301*b* may be a printer, and its removal does not have a negative effect on the computing system 300. As another example, the location-aware peripheral device 320 may determine that the change in the configuration for the peripheral device 310*a* may have moved its address space by 4 Kilo Bytes (KB), where this move is not outside of an acceptable range. When the location-aware peripheral device 320 determines that the changes in the characteristics of the devices are within acceptable parameters, the location-aware peripheral device 320 may allow the computing system 300 to operate as normal.

In some cases, however, the location-aware peripheral device 320 may find the changes to the computing system 300 have caused the computing system 300 to operate outside of acceptable parameters. For example, the location-aware peripheral device 320 may determine that the addition of the new peripheral device 310*c* is unacceptable, and/or may be conducting unacceptable activity. For example, the peripheral device 310*c* may be an external hard drive, and the acceptable parameters for the computing system 300 may prohibit any external hard drives from being added to the computing system 300. As another example, the new peripheral device 310*c* may be transmitting a series of transactions that appear to be scanning the contents of the memory subsystem 306. The acceptable parameters for the computing system 300 may provide that sequential scanning of memory addresses by a peripheral device is a reason for alarm.

When the location-aware peripheral device 320 finds that characteristics of a device in the computing system 300 cause the computing system 300 to operate outside of acceptable parameters, the location-aware peripheral device 320 can perform an action. In some implementations, the action taken by the location-aware peripheral device 320 may be proportionate to the nature of the problem. For example, when the new peripheral device 310*c* is an unknown device, or removal of the peripheral device 310*b* was not expected, the location-aware peripheral device 320 can flash lights on the exterior of the system, issue beeping noises, or send an alert to the processors 302 or the operating system. In some implementations, the action performed by the location-aware peripheral device 320 may be the same regardless of how far the operation of the computing system 300 is outside of acceptable ranges.

When the problem is more alarming, then the location-aware peripheral device 320 can configure itself to disable its own functionality. In some implementations, the location-aware peripheral device 320 may disable an operation that disables a function of the computing system 300. For example, the location-aware peripheral device 320 may cease responding to boot or configuration commands. In some cases, this may only render the location-aware peripheral device 320 inoperative, while in other cases this may result in booting of the computing system 300 being blocked. As another example, the location-aware peripheral device 320 may be a network interface, and by disabling its network interface function, the location-aware peripheral device 320 may render the computing system 300 incapable of communicating with a network. As another example, the location-aware peripheral device 320 may be a hard drive, or have non-volatile, persistent memory for storing data when the power is turned off. In this example, to protect any data that it is storing, the location-aware peripheral device 320 may disable access to stored data. When the data is the computing system's 300 operating system, this may prevent the computing system 300 from booting.

The disabled state of the location-aware peripheral device 320 may be remedied in several different ways. In some implementations, once the offending characteristic is fixed (e.g., the new peripheral device 310c is removed), the location-aware peripheral device 320 will find that the computing system 300 is once again operating within acceptable parameters, and will operate normally. In some implementations, the location-aware peripheral device 320 can be re-enabled with a security key. In some implementations, the location-aware peripheral device 320 can be updated with new or modified descriptions of acceptable parameters (e.g., the new peripheral device 310c is an expected and desired addition).

In some implementations, the location-aware peripheral device 320 may remain usable but reset itself, as a security precaution. For example, in some implementations, the location-aware peripheral device 320 may, upon finding the characteristics of the computing system 300 to be unacceptable, reset itself to a factory configuration. The factory configuration is the configuration the location-aware peripheral device 320 had when it left the factory and before it was received by an end consumer. Resetting to factory configuration may cause the location-aware peripheral device 320 to lose any configuration and/or data that it contained as a result of being used in the computing system 300. For example, resetting to a factory configuration may include deleting and/or reformatting any non-volatile memory that the location-aware peripheral device 320 includes.

In some cases, the location-aware peripheral device 320 may disable itself permanently. This may be desirable, for example, in particularly security-sensitive computing systems 300. In some implementations, the location-aware peripheral device 320 may delete its own firmware. In some implementations, the location-aware peripheral device 320 may physically self-destruct. For example, the location-aware peripheral device 320 may break a critical circuit that renders it inoperative. In some cases, the location-aware peripheral device 320 may be configured to also make the computing system 300 unusable. For example, the location-aware peripheral device 320 may overheat to the point where the computing system 300 is damaged. Permanently and irreparably destroying the location-aware peripheral device 320 may be a threat deterrent, and/or a way to ensure that sensitive information is destroyed.

Figure 4:
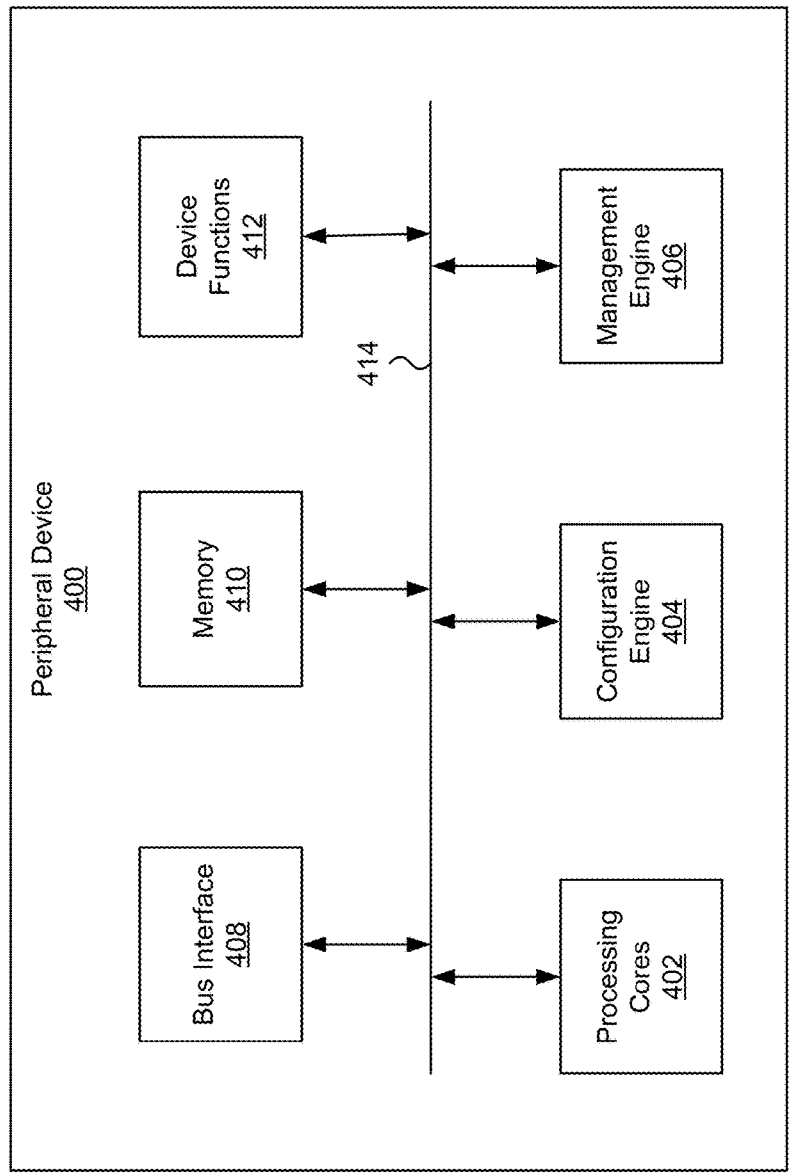
FIG. 4 illustrates an example of a location-aware, self-configuring peripheral device.

FIG. 4 illustrates an example of a location-aware, self-configuring peripheral device 400. Functionality and/or several components of the location-aware peripheral device 400 may be used without limitation with other embodiments disclosed elsewhere in this disclosure, without limitations. In some implementations, a location-aware peripheral device 400 may facilitate processing of packets and/or forwarding of packets from the location-aware peripheral device 400 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the location-aware peripheral device 400 may be the recipient and/or generator of packets. In some implementations, the location-aware peripheral device 400 may modify the contents of the packet before forwarding the packet to another device. The location-aware peripheral device 400 may be a peripheral device coupled to another computer device, a switch, a router or any other suitable device enabled for receiving and forwarding packets.

In one example, the location-aware peripheral device 400 may include processing logic 402, a configuration module 404, a management module 406, a bus interface module 408, memory 410, and a device functions module 412. These modules may be hardware modules, software modules, or a combination of hardware and software. In certain instances, modules may be interchangeably used with components or engines, without deviating from the scope of the disclosure. The location-aware peripheral device 400 may include additional modules, not illustrated here, such as components discussed with respect to the nodes disclosed in FIG. 6. In some implementations, the location-aware peripheral device 400 may include fewer modules. In some implementations, one or more of the modules may be combined into one module. One or more of the modules may be in communication with each other over a communication channel 414. The communication channel 414 may include one or more busses, meshes, matrices, fabrics, a combination of these communication channels, or some other suitable communication channel.

The processing logic 402 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 402 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 402 may be stored on a computer-readable storage medium, for example, in the form of a computer program. The computer-readable storage medium may be non-transitory. In some cases, the computer-readable medium may be part of the memory 410.

The memory 410 may include either volatile or non-volatile, or both volatile and non-volatile types of memory. The memory 410 may, for example, include random access memory (RAM), read only memory (ROM), Electrically Erasable Programmable Read-Only Memory (EEPROM), flash memory, magnetic memory, optical memory, solid state memory, and/or some other suitable storage media. In some cases, some or all of the memory 410 may be internal to the location-aware peripheral device 400, while in other cases some or all of the memory may be external to the location-aware peripheral device 400. The memory 410 may store an operating system comprising executable instructions that, when executed by the processing logic 402, provides the execution environment for executing instructions providing the functionality for the location-aware peripheral device 400. The memory 410 may also store and maintain data structures and, for example, routing tables for facilitating the functionality of the location-aware peripheral device 400. In some implementations, the memory 410 may store profiles describing a hardware and/or software configuration for a computing system. In some implementations, the memory 410 may store one or more descriptions of operating parameters that are acceptable for a computing system.

In some implementations, the configuration module 404 may include one or more configuration registers. Configuration registers may control the operations of the location-aware peripheral device 400. In some implementations, one or more bits in the configuration register can represent certain capabilities of the location-aware peripheral device 400. Configuration registers may be programmed by instructions executing in the processing logic 402, and/or by an external entity, such as a host device, an operating system executing on a host device, and/or a remote device. The configuration module 404 may further include hardware and/or software that control the operations of the location-aware peripheral device 400. For example, in some implementations, the configuration module 404 may be configured to enable or disable one or more operations of the location-aware peripheral device 400 based on instructions from the processing logic 402 and/or the device functions 412. For example, the configuration module 404 may enable or disable one or more of the device functions 412, and/or another operation of the location-aware peripheral device 400.

In some implementations, the management module 406 may be configured to manage different components of the location-aware peripheral device 400. In some cases, the management module 406 may configure one or more bits in one or more configuration registers at power up, to enable or disable certain capabilities of the location-aware peripheral device 400. In certain implementations, the management module 406 may use processing resources from the processing logic 402. In other implementations, the management module 406 may have processing logic similar to the processing logic 402, but segmented away or implemented on a different power plane than the processing logic 402.

The bus interface module 408 may enable communication with external entities, such as a host device and/or other components in a computing system, over an external communication medium. The bus interface module 408 may include a physical interface for connecting to a cable, socket, port, or other connection to the external communication medium. The bus interface module 408 may further include hardware and/or software to manage incoming and outgoing transactions. The bus interface module 408 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 408 may include the physical layer for any of these bus protocols, including a connector, power management, and error handling, among other things. In some implementations, the location-aware peripheral device 400 may include multiple bus interface modules for communicating with multiple external entities. These multiple bus interface modules may implement the same local bus protocol, different local bus protocols, or a combination of the same and different bus protocols.

The device functions 412 may include hardware and/or software for implementing features available to the location-aware peripheral device 400. In some implementations, the device functions 412 may include logic to implement an examination engine for examining characteristics of other devices and determining a status for an attached computing system. In some implementations, the device functions 412 may include hardware and/or software configured to implement functionality provided directly by the peripheral device 400. For example, the device functions 412 may include hardware and/or software configured to implement a security co-processor or a solid state hard drive.

In some implementations, the device functions 412 may include hardware and/or software configured to implement a protocol for communicating with externally connected devices or functions. For example, the device functions 412 may include hardware and/or software for communicating with a network. This device functions 412 may, for example, include physical connectors or physical ports for wired connection to a network, and/or antennas for wireless communication to a network. The device functions 412 may further include hardware and/or software configured to implement a network protocol stack. The device functions 412 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the location-aware peripheral device 400 may include multiple network interface modules, each configured to communicate with a different network. For example, in these implementations, the location-aware peripheral device 400 may include a device functions for communicating with a wired Ethernet network, a wireless 802.11 network, a cellular network, an Infiniband network, etc.

In some implementations, the location-aware peripheral device 400 may include multiple device functions, each configured to provide different functionality. For example, in these implementations, the location-aware peripheral device 400 may include a device function for communicating with a wired Ethernet network, device functions for communicating with a wireless 802.11 network, and device functions providing a storage array.

In some implementations, the location-aware peripheral device 400 is a PCI-based device. In these implementations, the location-aware peripheral device 400 includes a PCI interface for communicating with a host device. The term "PCI" may be used to describe any protocol in the PCI family of bus protocols, including the original PCI standard, PCI-X, AGP, and PCIe. The PCI protocols are standard bus protocols for connecting local peripheral devices to host devices. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface 408 may implement NVMe, and the location-aware peripheral device 400 may be connected to a computing system using a PCIe interface.

A PCI-based device may include one or more functions. A "function" describes operations that may be provided by the location-aware peripheral device 400. Examples of functions include mass storage controllers, network controllers, display controllers, memory controllers, serial bus controllers, wireless controllers, and encryption and decryption controllers, among others. In some cases, a PCI device may include more than one function. For example, a PCI device may provide a mass storage controller and a network adapter. As another example, a PCI device may provide two storage controllers, to control two different storage resources. In some implementations, a PCI device may have up to eight functions.

In some implementations, the location-aware peripheral device 400 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of a SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

The various components and modules of the location-aware peripheral device 400, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

II. Methods

Figure 5:
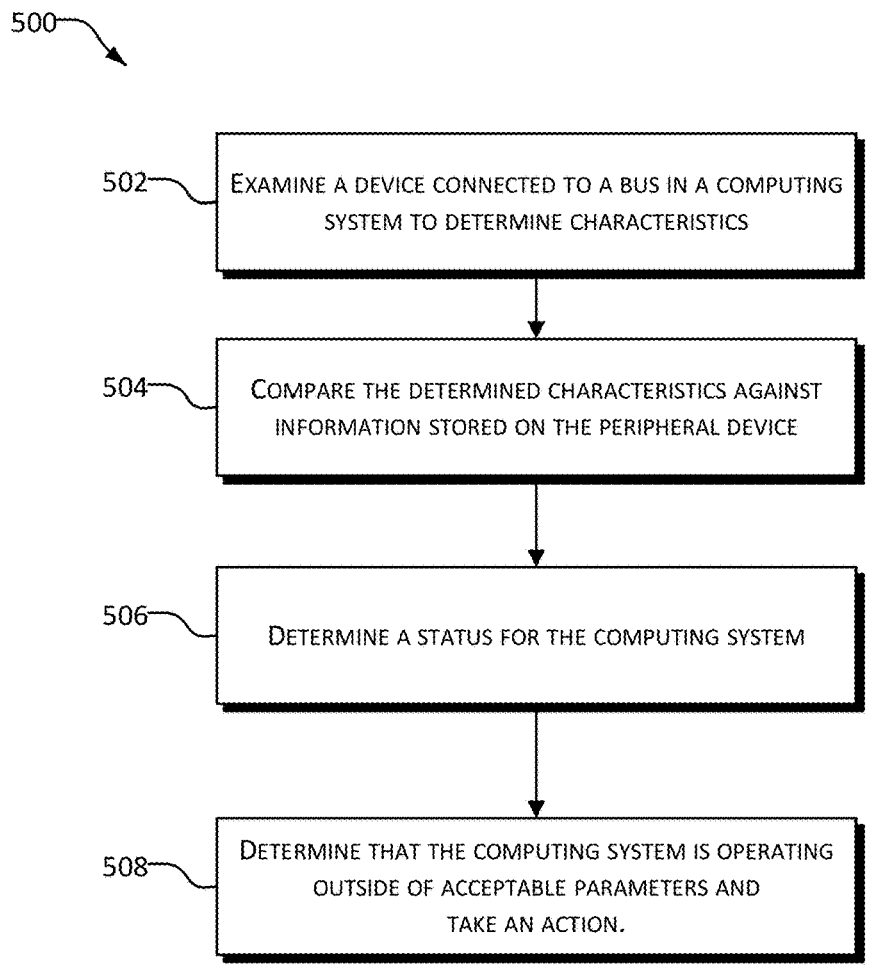
FIG. 5 illustrates an example of a process for determining a status for a computing system using a location-aware peripheral device, where the computing system's status directs an action by the peripheral device.

FIG. 5 illustrates an example of a process 500 for determining a status for a computing system using a location-aware peripheral device, where the computing system's status directs an action by the peripheral device. The example process 500 may be implemented by a location-aware, self-configuring peripheral device, such as is described with respect to FIGS. 2, 3A-3B, and 4.

In the example process 500 of FIG. 5, at step 502, the peripheral device may examine another device connected to a bus in a computing system. In examining the device, the peripheral device may determine characteristics of the other device. The characteristics of the other device may include the configuration of the other device and/or activity initiated by the other device on the bus. The peripheral device may examine the other device by sending transactions to the other device over the bus and receiving responses from the other device. The responses may include information about the other bus, such as configuration information (e.g., how the device is configured) and/or information about its type, class, manufacturer, or firmware. Alternatively or additionally, the peripheral device may examine the other device by monitoring transactions initiated or received by the other device over the bus. The peripheral device may then derive characteristics of the other device by comparing a pattern of the transactions to information stored on the peripheral device. Alternatively or additionally, the peripheral device may monitor memory transactions sent by the other device over the bus. The peripheral device may further derive characteristics of the other device by determining an operation of the peripheral device based on a pattern of the memory transactions.

Having determined the characteristics of the other device, the peripheral device may, at step 504, compare the determined characteristics against information stored on the peripheral device. In various implementations, the information describes acceptable characteristics for the computing system. In some implementations, this information may be pre-loaded onto the peripheral device. In some implementations, the peripheral device may obtain this information upon powering on in the computing system, and store the information for later use. In some implementations, the peripheral device may store the information only when powering on in a customer system for the first time.

In some implementations, the peripheral device may store the determined characteristics in a non-volatile memory in the peripheral device. In these implementations, the peripheral device may use the stored characteristics to describe the acceptable parameters for the computing system. For example, the peripheral device may store the characteristics of the other device the first time it powers on in a customer's computing system. The characteristics of the other device at time of first power-on thus establish the acceptable operating parameters for the computing system.

In some implementations, the peripheral device may determine a list of all the devices connected to the bus. In these implementations, the peripheral device may determine the characteristics of each of the devices in its list. The peripheral device may then compare the characteristics of all the devices to determine whether the computing system is operating within acceptable parameters. In some implementations, the peripheral device may store the characteristics of all the devices, and use the stored characteristics to describe the acceptable operating parameters for the computing system.

At step 506, the peripheral device may use the result of the comparison in step 504 to determine a status for the computing system. In some cases, the characteristics of the other device may indicate that the computing system is operating within acceptable parameters. In such cases, the peripheral device may take no action, other than to operate normally. In other cases, the characteristics of the other device may indicate that the computing system is operating outside of acceptable parameters. For example, the other device may be a USB drive that is running unrecognized software. Upon determining that the status of the computing system is that the computing system is operating outside of acceptable parameters, the peripheral device may take an action. For example, the peripheral device may issue an alert. As another example, the peripheral device may disable one of its own operations. In some cases, disabling an operation of the peripheral device may disable the computing system itself.

III. Computing Systems

Figure 6:
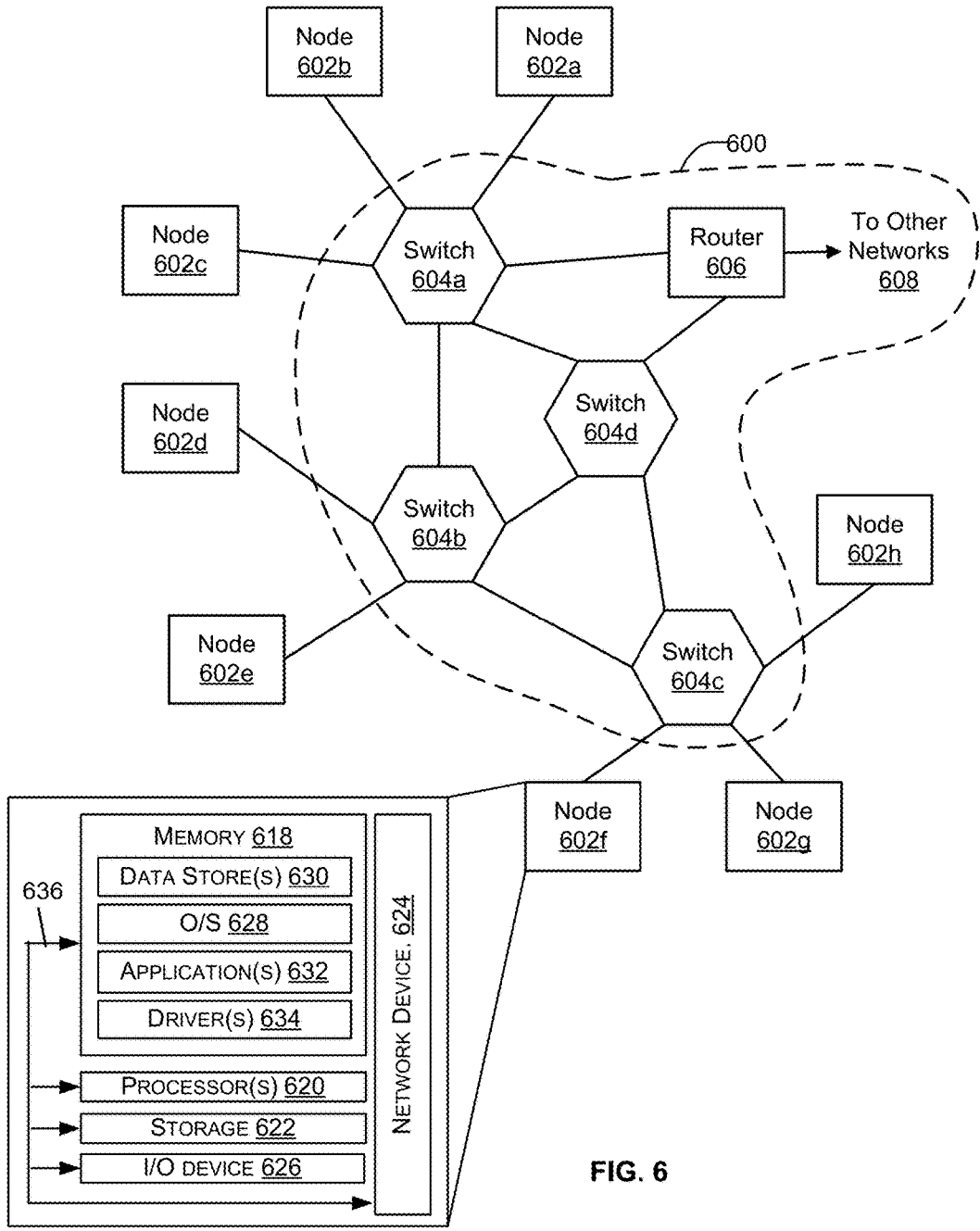
FIG. 6 illustrates an example architecture for features and systems described herein that includes one or more service provider computers and/or a user device connected via one or more networks, according to some embodiments.

FIG. 6 illustrates a network 600, illustrating various different types of network devices, such as nodes comprising the network device, switches and routers. One or more of the network devices illustrated in FIG. 6 may include the location-aware peripheral device 400 of FIG. 4, or may incorporate the functionality of a location-aware peripheral device. In certain embodiments, the network 600 may be based on a switched architecture with point-to-point links. As illustrated in FIG. 6, the network 600 includes a plurality of switches 604a-604d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 604a-604d may be connected to a plurality of nodes 602a-602h and provide multiple paths between any two nodes.

The network 600 may also include one or more network devices for connection with other networks 608, such as other subnets, LANs, wide area networks (WANs), or the Internet, and may be referred to as routers 606. Routers use headers and forwarding tables to determine the best path for forwarding the packets, and use protocols such as internet control message protocol (ICMP) to communicate with each other and configure the best route between any two devices.

In some examples, network(s) 600 may include any one or a combination of many different types of networks, such as cable networks, the Internet, wireless networks, cellular networks and other private and/or public networks. Interconnected switches 604a-604d and router 606, if present, may be referred to as a switch fabric, a fabric, a network fabric, or simply a network. In the context of a computer network, terms "fabric" and "network" may be used interchangeably herein.

Nodes 602a-602h may be any combination of host systems, processor nodes, storage subsystems, and I/O chassis that represent user devices, service provider computers or third party computers.

User devices may include computing devices to access an application 632 (e.g., a web browser or mobile device application). In some aspects, the application 632 may be hosted, managed, and/or provided by a computing resources service or service provider. The application 632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 608. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 602a-602h may include at least one memory 618 and one or more processing units (or processor(s) 620). The processor(s) 620 may be implemented in hardware, computer-executable instructions, firmware, or combinations thereof. Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the node(s) 602a-602h, the memory 618 may be volatile (such as RAM) and/or non-volatile (such as ROM, flash memory, etc.). The memory 618 may include an operating system 628, one or more data stores 630, one or more application programs 632, one or more drivers 634, and/or services for implementing the features disclosed herein.

The operating system 628 may support nodes 602a-602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 628 may also be a proprietary operating system.

The data stores 630 may include permanent or transitory data used and/or operated on by the operating system 628, application programs 632, or drivers 634. Examples of such data include web pages, video data, audio data, images, user data, and so on. The information in the data stores 630 may, in some implementations, be provided over the network(s) 608 to user devices 604. In some cases, the data stores 630 may additionally or alternatively include stored application programs and/or drivers. Alternatively or additionally, the data stores 630 may store standard and/or proprietary software libraries, and/or standard and/or proprietary application user interface (API) libraries. Information stored in the data stores 630 may be machine-readable object code, source code, interpreted code, or intermediate code.

The drivers 634 include programs that may provide communication between components in a node. For example, some drivers 634 may provide communication between the operating system 628 and additional storage 622, network device 624, and/or I/O device 626. Alternatively or additionally, some drivers 634 may provide communication between application programs 632 and the operating system 628, and/or application programs 632 and peripheral devices accessible to the service provider computer. In many cases, the drivers 634 may include drivers that provide well-understood functionality (e.g., printer drivers, display drivers, hard disk drivers, Solid State Device drivers). In other cases, the drivers 634 may provide proprietary or specialized functionality.

The service provider computer(s) or servers may also include additional storage 622, which may include removable storage and/or non-removable storage. The additional storage 622 may include magnetic storage, optical disks, solid state disks, flash memory, and/or tape storage. The additional storage 622 may be housed in the same chassis as the node(s) 602a-602h or may be in an external enclosure. The memory 618 and/or additional storage 622 and their associated computer-readable media may provide non-volatile storage of computer-readable instructions, data structures, program modules, and other data for the computing devices. In some implementations, the memory 618 may include multiple different types of memory, such as SRAM, DRAM, or ROM.

The memory 618 and the additional storage 622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 618 and the additional storage 622 are examples of computer storage media. Additional types of computer storage media that may be present in the node(s) 602a-602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 602a-602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 602a-602h may also include I/O device(s) 626, such as a keyboard, a mouse, a pen, a voice input device, a touch input device, a display, speakers, a printer, and the like. The node(s) 602a-602h may also include one or more communication channels 636. A communication channel 636 may provide a medium over which the various components of the node(s) 602a-602h can communicate. The communication channel or channels 636 may take the form of a bus, a ring, a switching fabric, or a network.

The node(s) 602a-602h may also contain network device(s) 624 that allow the node(s) 602a-602h to communicate with a stored database, another computing device or server, user terminals and/or other devices on the network(s) 600. The network device(s) 624 of FIG. 6 may include similar components discussed with reference to the location-aware peripheral device 400 of FIG. 4.

In some implementations, the network device 624 is a peripheral device, such as a PCI-based device. In these implementations, the network device 624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the network device 624 may include bus interface module that implements NVMe, and the network device 624 may be connected to a computing system using a PCIe interface.

A PCI-based device may include one or more functions. A "function" describes operations that may be provided by the network device 624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 4, FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Peripheral Component Interconnect (PCI)-based device, comprising:
    a PCI-based bus interface configured to connect the PCI-based device to a PCI-based bus in a particular computing system;
    a memory storing a set of operating parameters for a computing system and one or more actions to be taken by the PCI-based device when operating parameters of the particular computing system are not within the set of operating parameters and
    an examination engine, wherein the examination engine is configured to:
    examine, using the PCI-based bus interface, other physical devices connected to the PCI-based bus, wherein examining includes determining characteristics of the other physical devices, wherein the characteristics include a configuration of the other physical devices or activity on the PCI-based bus by the other physical devices;
    compare the characteristics against the set of operating parameters, wherein comparing includes identifying parameters that correspond to the characteristics and determining whether the characteristics are within a specified range of identified parameters;
    determine a status for the particular computing system, wherein the status is based on a proximity of the characteristics to the set of operating parameters;
    select an action from the one or more actions, wherein the action is selected based on the status; and
    perform the action, wherein the action includes disabling an operation of the PCI-based device.

2. The PCI-based device of claim 1, wherein the examination engine is configured to examine the other physical devices by sending, using the PCI-based bus interface, transactions to the other physical devices and receiving responses, through the PCI-based bus interface, from the other physical devices, the responses including data for determining the characteristics.

3. The PCI-based device of claim 1, wherein the examination engine is configured to examine the other physical devices by monitoring, using the PCI-based bus interface, transactions sent by the other physical devices, the transactions providing data for determining the characteristics.

4. The PCI-based device of claim 1, wherein disabling the operation of the PCI-based device disables the computing system.

5. The PCI-based device of claim 1, wherein the PCI-based device is a Peripheral Component Interconnect Express (PCIe) device and the PCI-based bus is a PCIe bus.

6. The PCI-based device of claim 1, wherein the PCI-based device is a hard drive.

7. A peripheral device, comprising:
 a bus interface configured to communicatively couple the peripheral device to a bus in a particular computing system; and
 a memory storing a set of operating parameters for a computing system and one or more actions to be taken by the peripheral device when operating parameters of the particular computing system are not within the set of operating parameters;
 wherein the peripheral device is configured to:
  examine, using the bus interface, a second physical device connected to the bus, wherein examining includes determining characteristics of the second physical device;
  compare the determined characteristics against the set of operating parameters; and
  determine, based on a result of the comparison, a status for the particular computing system, the status indicating whether the particular computing system is operating within the set of operating parameters;
  select an action from the one or more actions, wherein the action is selected based on the status; and
  perform the action, wherein the action modifies an operation of the peripheral device.

8. The peripheral device of claim 7, wherein the characteristics of the second physical device include a configuration of the second physical device or activity on the bus initiated or received by the second physical device.

9. The peripheral device of claim 7, wherein the result of the comparison is that the characteristics are not within the set of operating parameters, and wherein the status is that the computing system is operating outside of the set of operating parameters.

10. The peripheral device of claim 9, wherein the action of the peripheral device is to send an alert.

11. The peripheral device of claim 9, wherein the action of the peripheral device is to disable an operation of the peripheral device, wherein disabling the operation disables a function of the computing system.

12. The peripheral device of claim 11, wherein the operation of the peripheral device is transmitting network traffic.

13. The peripheral device of claim 11, wherein the operation of the peripheral device is responding to a boot command.

14. The peripheral device of claim 7, wherein the peripheral device is configured to examine the second physical device by monitoring transactions sent on the bus by the second physical device.

15. The peripheral device of claim 7, wherein the second physical device is a processor interface device.

16. The peripheral device of claim 7, further comprising a non-volatile memory, and wherein the operation of the peripheral device includes processing read and write transactions directed to the non-volatile memory.

17. The peripheral device of claim 16, wherein the status is that the computing system is operating outside of the set of operating parameters, and wherein the action disables access to the non-volatile memory.

18. A method, comprising:
 examining, by a peripheral device, a second physical device connected to a bus in a computing system, wherein the peripheral device is communicatively coupled to the bus, and wherein examining includes determining characteristics of the second physical device;
 comparing the characteristics against a set of operating parameters stored on the peripheral device, wherein the set of operating parameters are associated with one or more actions to be taken by the peripheral device when operating parameters of the computing system are not within the set of operating parameters;
 determining, based on a result of the comparison, a status for the computing system, the status indicating whether the computing system is operating within the set of operating parameters;
 select an action from the one or more actions, wherein the action is selected based on the status; and
 perform the action, wherein the action modifies an operation of the peripheral device upon determining that the status of the computing system is that the computing system is operating outside of the set of operating parameters.

19. The method of claim 18, wherein examining the second physical device includes:
 sending transactions to the second physical device over the bus and receiving responses from the second physical device over the bus, the responses including information about the second physical device; and
 deriving the characteristics from the information included in the responses.

20. The method of claim 18, wherein examining the second physical device includes:
 monitoring transactions on the bus initiated or received by the second physical device; and
 deriving the characteristics by determining an operation of the second physical device from information derived from the monitored transactions.

21. The method of claim 18, further comprising:
 storing the characteristics in a non-volatile memory of the peripheral device and
 using the stored characteristics to determine whether a behavior of the second physical device has changed.

22. The method of claim 18, further comprising:
 determining additional devices connected to the bus;
 determining additional characteristics of the additional devices; and
 storing a list of additional devices and the additional characteristics in a non-volatile memory of the peripheral device.

23. The method of claim 22, further comprising:
 using the stored additional characteristics to determine whether any of the additional devices have been removed or whether more devices have been added to the bus.

* * * * *